US010713560B2

(12) United States Patent
Applegate et al.

(10) Patent No.: US 10,713,560 B2
(45) Date of Patent: Jul. 14, 2020

(54) LEARNING A VECTOR REPRESENTATION FOR UNIQUE IDENTIFICATION CODES

(71) Applicant: Staples, Inc., Framingham, MA (US)

(72) Inventors: Ryan Applegate, San Mateo, CA (US); Majid Hosseini, San Mateo, CA (US); Karthik Kumara, San Mateo, CA (US); Timothy Wee, San Mateo, CA (US)

(73) Assignee: Staples, Inc., Framingham, MA (US)

( * ) Notice: Subject to any disclaimer, the term of this patent is extended or adjusted under 35 U.S.C. 154(b) by 872 days.

(21) Appl. No.: 15/204,941

(22) Filed: Jul. 7, 2016

(65) Prior Publication Data

US 2017/0185585 A1 Jun. 29, 2017

Related U.S. Application Data

(60) Provisional application No. 62/271,829, filed on Dec. 28, 2015.

(51) Int. Cl.
*G06N 3/04* (2006.01)
*G06N 3/08* (2006.01)

(52) U.S. Cl.
CPC ........... *G06N 3/0472* (2013.01); *G06N 3/088* (2013.01)

(58) Field of Classification Search
CPC ........ G06N 3/0472; G06N 3/088; G06N 3/08; G06F 17/2785; Y04S 10/54
USPC .......................................................... 706/25
See application file for complete search history.

(56) References Cited

U.S. PATENT DOCUMENTS

| | | | |
|---|---|---|---|
| 9,589,237 B1 * | 3/2017 | Qamar | G06F 16/245 |
| 9,864,951 B1 * | 1/2018 | Makhijani | G06F 17/276 |
| 2014/0229158 A1 * | 8/2014 | Zweig | G06N 3/04 |
| | | | 704/9 |
| 2014/0279232 A1 | 9/2014 | Lau et al. | |
| 2015/0081457 A1 | 3/2015 | Agnes | |

(Continued)

OTHER PUBLICATIONS

Kurata, "Method for learning classification model, computer system, and computer program", JP 2015-170953 A, Filed on Aug. 31, 2015. (Year: 2017).*

(Continued)

*Primary Examiner* — Dave Misir
(74) *Attorney, Agent, or Firm* — Patent Law Works, LLP

(57) ABSTRACT

A computer-implemented method and system are described for learning a vector representation for unique identification codes. An example method may include generating a unique identification code list using one or more virtual interaction contexts, the unique identification code list being a list of unique identification codes, selecting a target unique identification code in the unique identification code list, and determining, from the unique identification code list, an input set of unique identification codes using the target unique identification code, the input set including the target unique identification code and one or more context unique identification codes. Some implementations may further include inputting the input set of unique identification codes into a semantic neural network model, the semantic neural network model including one or more weight matrices, and modifying the one or more weight matrices using the input set of unique identification codes.

19 Claims, 8 Drawing Sheets

(56) References Cited

U.S. PATENT DOCUMENTS

| | | | |
|---|---|---|---|
| 2015/0178383 A1* | 6/2015 | Corrado | G06F 16/50 707/740 |
| 2016/0125048 A1* | 5/2016 | Hamada | G06F 16/24578 707/734 |
| 2016/0203485 A1* | 7/2016 | Subramanian | G06Q 30/00 705/44 |

OTHER PUBLICATIONS

Rong, "word2vec Parameter Learning Explained", 2014 (Year: 2014).*

Glorot, "Understanding the difficulty of training deep feedforward neural networks," 2010 (8 pages).

Mikolov et al., "Linguistic Regularities in Continuous Space Word Representations," 2013 (6 pages).

Webpage for "word2vec," downloaded from https://code.google.com/p/word2ved dated Jul. 29, 2013 (7 pages).

Mikolov et al., "Efficient Estimation of Word Representations in Vector Space," Sep. 7, 2013 (12 pages).

Mikolov et al., "Distributed Representations of Words and Phrases and their Compositionality," Oct. 16, 2013 (9 pages).

Goldberg et al., "word2vec Explained: Deriving Mikolov et al.'s Negative-Sampling Word-Embedding Method," Feb. 14, 2014 (5 pages).

Rong, "word2vec Parameter Learning Explained," Jun. 5, 2016 (21 pages).

Wikipedia, "Backpropagation," downloaded Jul. 5, 2016, from https://en.wikipedia.org/wiki/Backpropagation (10 pages).

Wikipedia, Softmax function, downloaded Jul. 5, 2016, from https://en.wikipedia.org/wiki/Softmax_function (10 pages).

Barkan et al., "Item2Vec: Neural Item Embedding for Collaborative Filtering," Microsoft Tel Aviv University, 2016 (8 pages).

* cited by examiner

750 →

108a30, 1x378, osdykl, 9054b3, 747z81, (811508) 1r8230, 9n5473, 905ar5, 91m881, 74kl81,108%30, 9054eE3, 905sW5, 108230, 91bo881, 90h~705, 511378

752 ↑ (pointing to 811508)

754 { (bracketing the list)

| Target SKU = SKU 5 | Positive training examples | Negative training examples |
|---|---|---|
| Upsell clustering (792) | - SKU 5, SKU 8, SKU 11, SKU 12 | - SKU 1, SKU 3, SKU5, SKU 6<br>- SKU 3, SKU5, SKU 10 |
| Cross-sell clustering (794) | - SKU 3, SKU 5, SKU 10<br>- [SKU 5], SKU 4, SKU 7 | |
| Co-occurrence (796) | - SKU 1, SKU 2, SKU 3, SKU 4, SKU 5, SKU 6, SKU 7<br>- SKU 1, SKU 3, SKU 5, SKU 6<br>- SKU 3, SKU 4, SKU5, SKU 7, SKU 8, SKU 9, SKU 10<br>- SKU 3, SKU 5, SKU 10<br>- SKU 5, SKU 8, SKU 11, SKU 12 | - [SKU 5], SKU 2, SKU 4, SKU 7<br>- [SKU 5], SKU 4, SKU 7, SKU 8, SKU 9<br>- SKU 5, SKU 8, SKU 11 |

Figure 7C

LEARNING A VECTOR REPRESENTATION FOR UNIQUE IDENTIFICATION CODES

CROSS-REFERENCE TO RELATED APPLICATIONS

This application claims the benefit under 35 U.S.C. § 119(e) of U.S. Provisional Application No. 62/271,829, entitled "Method for Learning a Vector Representation for Product Stock Keeping Units (SKUs)", filed on Dec. 28, 2015, the entire contents of which is incorporated herein by reference.

BACKGROUND

The present disclosure relates to technology for modeling unique identification codes in virtual interaction context using natural language processing.

Providing online users with recommendations relevant to items that they show interest in facilitates an online interaction process and improves the experience of the users of an online service. However, there is a large number of user activities and transactions (thousands, millions, etc.) performed on a recommendation system every hour. Modeling relevant or similar products is therefore particularly challenging because of the amount of data needed to be processed. Thus, there is a need to process large volumes of data efficiently, and to recommend product based on unique identification codes that are actually relevant to online users.

On the other hand, for new users, very little historical data about that user may be available to generate effective item recommendations during a user visit to an associated website. Thus, performing data modeling on the unique identification codes, such as stock keeping units, directly can result in sparse data problems, and, as a result, current systems are ineffective at identifying good latent representations that can allow models to share information between similar unique identification codes for operations such as interaction prediction, recommendations, item clustering, etc.

BRIEF DESCRIPTION OF THE DRAWINGS

The disclosure is illustrated by way of example, and not by way of limitation in the figures of the accompanying drawings in which like reference numerals are used to refer to similar elements.

FIGS. 7A-7C illustrate examples of unique identification code lists.

SUMMARY

Figure 1:
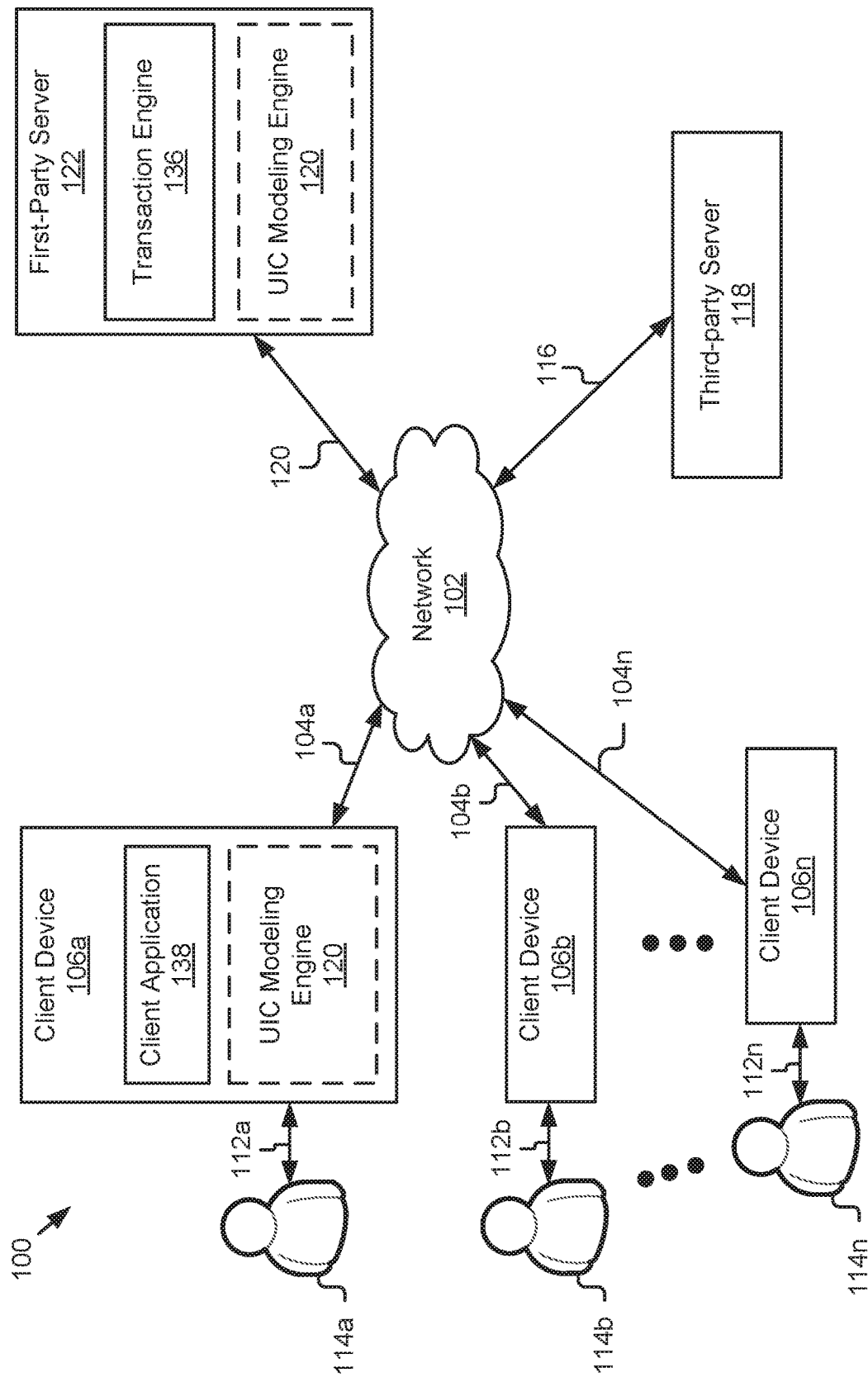
FIG. 1 is a block diagram of an example computing system for learning a vector representation for unique identification codes.

According to one innovative aspect of the subject matter described in this disclosure, a computer-implemented method includes one or more processors and a memory storing instructions that, when executed by the one or more processors, cause the system to perform operations including: generating a unique identification code list using one or more virtual interaction contexts, the unique identification code list being a list of unique identification codes; selecting a target unique identification code in the unique identification code list; determining from the unique identification code list, an input set of unique identification codes using the target unique identification code, the input set including the target unique identification code and one or more context unique identification codes; inputting the input set of unique identification codes into a semantic neural network model, the semantic neural network model including one or more weight matrices; and modifying the one or more weight matrices using the input set of unique identification codes.

In general, according to yet another innovative aspect of the subject matter described in this disclosure may be embodied in a method that comprises generating, using one or more computing devices, a unique identification code list using one or more virtual interaction contexts, the unique identification code list being a list of unique identification codes; selecting, using the one or more computing devices, a target unique identification code in the unique identification code list; determining, using the one or more computing devices, from the unique identification code list, an input set of unique identification codes using the target unique identification code, the input set including the target unique identification code and one or more context unique identification codes; inputting, using the one or more computing devices, the input set of unique identification codes into a semantic neural network model, the semantic neural network model including one or more weight matrices; and modifying, using the one or more computing devices, the one or more weight matrices using the input set of unique identification codes.

These and other embodiments may each optionally include one or more of the following features and/or operations. For instance, some embodiments may include that inputting the input set of unique identification codes to the semantic neural network model further includes identifying, using the one or more computing devices, the target unique identification code as an input unique identification code to the semantic neural network model, and identifying, using the one or more computing devices, the one or more context unique identification codes as desired output context unique identification codes of the semantic neural network model corresponding to the target unique identification code; that modifying the one or more weight matrices includes computing, using the one or more computing devices, one or more output context unique identification codes using the target unique identification code and the one or more weight matrices, computing, using the one or more computing devices, a prediction error using the computed output context unique identification codes and the desired output context unique identification codes, modifying, using the one or more computing devices, the one or more weight matrices using the prediction error, determining, using the one or more computing devices, whether the prediction error satisfies a threshold value, and responsive to the prediction error not satisfying the threshold value, re-inputting, using the one or more computing devices, the input set of unique identification codes into the semantic neural network model associated with the one or more modified weight matrices; receiving, using the one or more computing devices, an input unique identification code; computing, using the one or more computing devices, one or more output context unique identification codes for the input target unique identification code using the input target unique identification code and the one or more modified weight matrices; generating, using the one or more computing devices, an interaction cluster associated with the input target unique identification code using the one or more computed output context unique identification codes, the interaction cluster indicating that the one or more computed output context unique identification codes are likely to occur together with the input target unique identification code; that determining the input set of unique identification codes includes determining, using the one or more computing devices, a window size value corresponding to a length of the input set associated with the one or more virtual interaction contexts, and determining, using the one or more computing devices, from the unique identification code list, an input set of unique identification codes using the target unique identification code and the window size value, the target unique identification code being at a predetermined location relative to the one or more context unique identification codes within the input set of unique identification codes; that determining the input set of unique identification codes includes clustering, using the one or more computing devices, the one or more context unique identification codes with the target unique identification code based on an electronic sales channel associated with the target unique identification code; that preparing the unique identification code list using the one or more virtual interaction contexts includes aggregating, using the one or more computing devices, the unique identification codes included in the one or more virtual interaction contexts, the one or more virtual interaction contexts occurring within a period of time, and removing, using the one or more computing devices, one or more repetitive unique identification codes from the aggregated unique identification codes; that the one or more virtual interaction contexts include one or more of a shopping cart, a browsing session of interaction items, a wish list of interaction items, and a favorite list of interaction items; determining, using the one or more computing devices, a number of neurons of the neural network model; and that the semantic neural network model includes one or more of SkipGram model and Continuous Bag-of-Words model.

In general, according to yet another innovative aspect of the subject matter described in this disclosure may be embodied in a method that comprises training, using one or more computing devices, one or more weight matrices of a semantic natural language processing model using sets of unique identification codes; receiving, using the one or more computing devices, an input unique identification code; computing, using the one or more computing devices, one or more output context unique identification codes for the input unique identification code using one or more modified weight matrices; and generating, using the one or more computing devices, an interaction cluster associated with the input unique identification code using the one or more computed output context unique identification codes, the interaction cluster indicating that the one or more computed output context unique identification codes are likely to occur together with the target unique identification code.

Other innovative aspects include corresponding systems, methods, apparatus, and computer program products.

The disclosure is particularly advantageous over other existing solutions in a number of respects. By way of example and not limitation, the technology described herein enables a computing system to learn a vector representation of unique identification codes (e.g., stock keeping units) using natural language processing. In some embodiments the technology described herein applies natural language processing to predict probable context unique identification codes using a target unique identification code. These and other embodiments beneficially allow a computing device to analyze unique identification codes and associated context more rapidly and with fewer computing resources that past methods. In particular, the techniques described herein improve computational accuracy while reducing processing time. Further benefits can be seen in solutions to the problems presented in the background of this disclosure.

The features and advantages described herein are not all-inclusive and many additional features and advantages will be apparent to one or ordinary skill in the art in view of the figures and description. Moreover it should be noted that the language used in the specification has been selected for readability and instructional purposes and not to limit the scope of the inventive subject matter.

DETAILED DESCRIPTION

As set forth in detail below, the technology described herein provides an innovative, fine-grained, non-trivial approach to learn a vector representation of unique identification codes (e.g., stock keeping units or SKUs) using natural language processing. More specifically, in an example embodiment, this document describes a method for learning an informative and nuanced representation for unique identification codes. In some cases, the unique identification codes may be represented as vectors. Unexpectedly, the method may apply a NLP (natural language processing) algorithm to the retail domain. One such algorithm that can be used is word2vec. Word2vec provides bag-of-words and skip-gram architectures for computing vector representations of words, which may then be used in natural language processing. More specifically, the NLP algorithm disclosed herein, can find a vector representation for unique identification codes using the different contexts in which a particular unique identification code appears throughout the identification code corpus. Context in this case is the surrounding unique identification codes in which a particular unique identification code appears.

In an example embodiment, the word2vec algorithm uses a 2-layer neural network to model the co-occurrence of a unique identification code and other unique identification codes that appear in the unique identification code's context. In this example, two different architectures may be used: 1) an algorithm (e.g., Continuous Bag-of-Words, also referred to herein as "CBOW") can receive the context unique identification codes as input and attempt to predict the middle unique identification code (e.g., a target unique identification code with an equal number of contextual unique identification codes surrounding the target unique identification code) of the context; and/or 2) an algorithm (e.g., SkipGram) can take the unique identification code being modeled as the input, and predict context unique identification codes. Both of these architectures can find the parameters θ that maximize the log probability of the unique identification codes and their contexts appearing together:

$$\arg\max_\theta \log \Pi_{(sku,context)\in sku\_lists} p(c|sku;\theta) \quad (1)$$

The parameters θ may be adjusted by the back propagation algorithm. It is noted that both architectures can provide similar results. As discussed further below with reference to FIGS. 3, 6, and 7, in some embodiments, the parameters θ of this model may be the weight matrices: $W'_{N \times V}$ and $W_{V \times N}$, where V is the number of distinct unique identification codes in the corpus, and N is the number of hidden units, which may be a configurable parameter. The number of hidden units is the number of dimensions in the final vector representation. The input layer of the neural network may be a "one-hot" encoded vector indicating which unique identification code is being passed in (one-hot encoding, or "one-of-k" encoding) is a vector with a 1 in one of the elements, and 0 everywhere else. The encoding indicates the presence of an element (e.g., the input unique identification code). The following is an example of a one-hot encoded vector: [0,0,0,0,1,0, . . . 0,0,0]. The hidden layer of the neural network may be considered a "latent" space in which the unique identification codes may be embedded. The final layer is the prediction layer, where, in the SkipGram case, the probability may be estimated for each context unique identification code of the input unique identification code.

Figure 8:
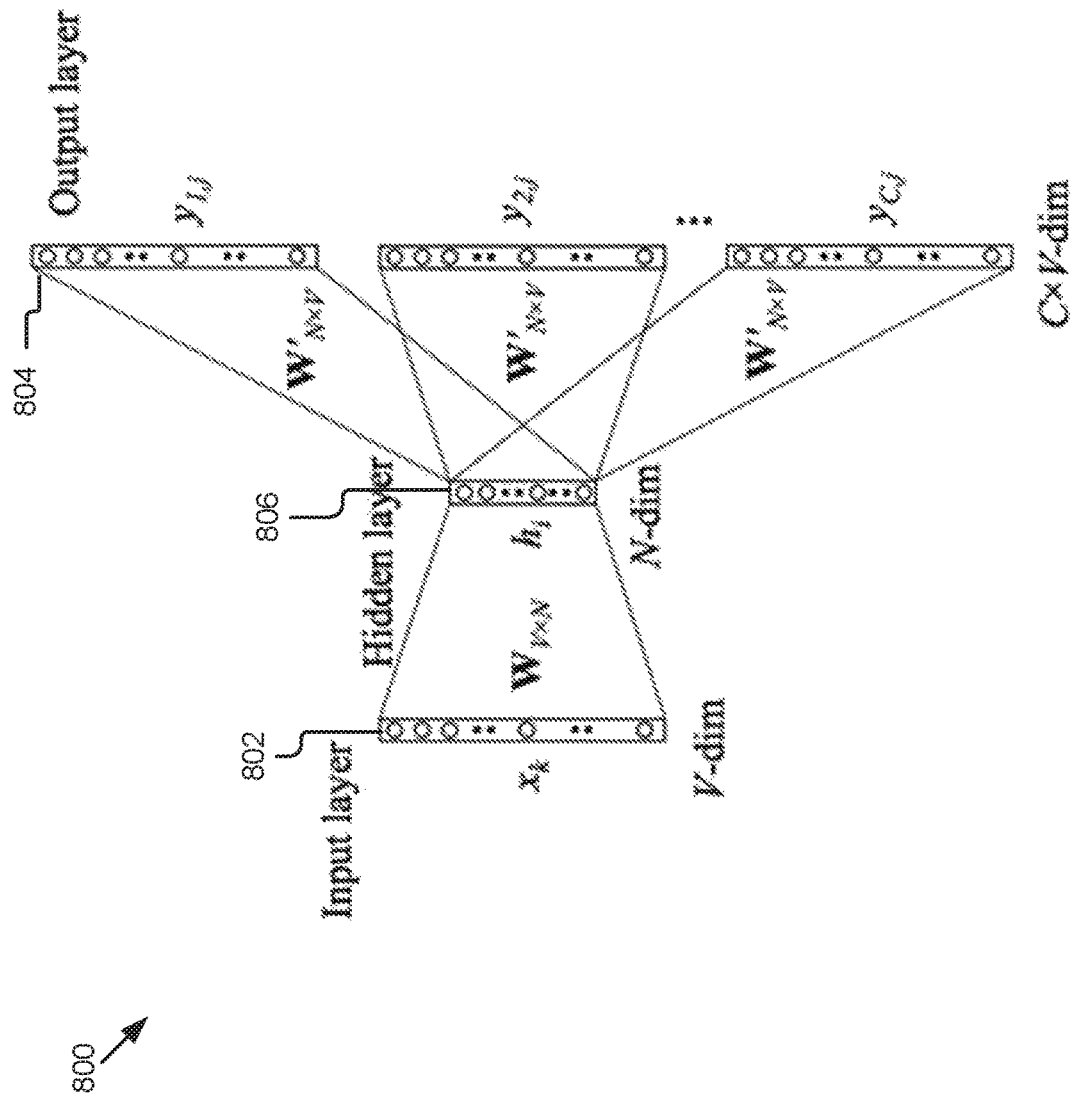
FIG. 8 illustrates an example of a neural network model.

While SkipGram is used as an example throughout this document, it should be understood that CBOW or other suitable natural language processing algorithms can also be used and are applicable and contemplated. A diagram of an example SkipGram network architecture is depicted in FIG. 8.

Using a neural network model with NLP algorithm is advantageous as it allows the vector representation to be automatically optimized over time as the number of user activities and transactions provided to the system as training examples increases.

In some embodiments, a method for learning a vector representation of unique identification codes may be performed by a system that also processes inventory mapping, user transactions, and activities such as item purchases, item browsing, and other data to provide for an online interaction service. In some embodiments, the system aggregates unique identification codes of interaction items that co-occur in different contexts. For example, the system may collect unique identification codes of interaction items that are included virtual interaction contexts, such as in the same shopping cart, online document, or browsed in the same session. In some embodiments, the unique identification codes may be in the form of an ID that uniquely identifies a corresponding item, such as a product stock keeping unit ("SKU"). For example, the unique identification codes may be product numbers or product codes that have no literal meaning, unlike sentences and words that are typically processed using NLP algorithms. A unique identification code may be a combination of characters, numbers and symbols, in uppercase and/or lowercase, or have another suitable makeup. In some embodiments, the unique identification codes may be unregulated or non-standardized, and/or the unique identification codes may be generated randomly.

In some embodiments, once aggregated, the system may treat the list of aggregated unique identification codes as a document. In other words, the system can generate one or more unique identification code sentences (e.g., groups of contextual unique identification codes) from the list of unique identification codes the system collects from different virtual interaction contexts as described above. In some embodiments, the system may determine one or more input sets of unique identification codes from the document. These input sets of unique identification codes may be used as training examples for a semantic neural network model. One or more weight matrices of the semantic neural network model may be modified using the input sets of unique identification codes.

Once the neural network model is trained by the input sets of unique identification codes, the system may receive an input unique identification code at runtime. In some embodiments, the system may compute one or more output context unique identification codes for the input unique identification code using the weight matrices of the neural network model, which may be modified during the training process with the input sets as training examples. The system may use the output context unique identification codes to generate an interaction cluster associated with the input unique identification code. The interaction cluster may include one or more items corresponding to the output context unique identification codes, and may indicate that these items are likely to occur together with the item corresponding to the input unique identification code within an interaction context. In the example of a virtual shopping cart, an interaction cluster may include products corresponding to output context SKUs indicating that these products are likely to occur together (e.g., for recommendation, cross-selling, or up-selling) with a target product having a target SKU. The interaction cluster can be used for different purposes. For example, the interaction cluster can be used for user purchase prediction, user purchase sequence modeling, user browsing sequence modeling, etc. The interaction cluster can also be used in generating suggestive recommendations for users who interact with, purchase, consider purchasing, etc., an item associated with an input unique identification code, thus facilitating their online interaction process and enabling an online content provider to retain those users at the online user's website. For example, an online retailer may potentially generate additional revenue based on the computed cross-selling or up-selling strategy, although other embodiments are contemplated.

FIG. 1 is a block diagram of an example computing system 100, which may include one or more client devices 106a, 106b . . . 106n (106a, 106b . . . 106n may be referred to simply as 106), a third-party server 118, and/or a first-party server 122, depending on the configuration. The components of the system 100 may work together to learn and apply a vector representation for unique identification codes. These elements 106, 118, 122, etc., include non-transitory electronics (memor(ies), processor(s), data communication interfaces (e.g., wireless, wired, etc.), displays, input devices, etc.). These elements 106, 118, 122, etc., may be coupled for electronic communication via a computer network 102 (one or more public, private, virtual, etc., computer networks).

The client device 106 includes one or more computing devices having data processing and communication capabilities. The client device 106 may couple to and communicate with other client devices 106 and the other entities of the system 100 via the network 102 using a wireless and/or wired connection, as illustrated by the signal lines 104a, 104b . . . 104n. Examples of client devices 106 may include, but are not limited to, mobile phones, tablets, laptops, desktops, netbooks, server appliances, servers, virtual machines, TVs, etc. The system 100 may include any number of client devices 106, including client devices of the same or different type. Users 114a, 114b . . . 114n may interact with the client devices 106a, 106b . . . 106n using one or more input/output devices (e.g., keyboards, mice, touchscreens, etc.) as illustrated by lines 112a, 112b . . . 112n respectively.

A client device 106 may include one or more of the client application 138, a unique identification code modeling engine 120 (also referred to herein as the UIC modeling engine 120), and/or components thereof. The client application 138 includes computer logic executable by a processor on a client device 106 to provide for user interaction, receive user input, present information to the user via a display, and send data to and receive data from the other entities of the system 100 via the network 102. In some implementations, the client application 138 may generate and present user interfaces based, at least in part, on information received from the transaction engine 136 and/or a web server via the network 102. For example, a customer/user 114 may use the client application 138 to receive the item pages (e.g., product pages) provided by the first-party server 122, view various items available online, add items to a virtual cart, purchase items, receive discounts on items, etc. In some implementations, the client application 138 includes a web browser and/or code operable therein, a customized client-side application (e.g., a dedicated mobile app), a combination of both, etc.

The UIC modeling engine 120 includes computer logic that, when executed, programs a processor to generate a unique identification code list based on virtual interaction context, determine input sets of unique identification codes from the unique identification code list, and use the input sets to modify one or more weight matrices of a semantic neural network model and other operations discuss herein. The unique identification code list and the input sets may be selectively determined as discussed further herein. Responsive to training the semantic neural network model using the input sets, the UIC modeling engine 120 may program the processor to compute output context unique identification codes for a particular input unique identification code it receives. The UIC modeling engine 120 may be coupled to a data store to store, retrieve, and/or manipulate data stored therein and may be coupled to the transaction engine 136, the web server 134, the client application 138, and/or other components of the system 100 to exchange information, to call functions, store, update, and/or retrieve data therefrom. The UIC modeling engine 120 is discussed in further detail elsewhere herein.

The first-party server 122 may include a UIC modeling engine 120, a web server (not shown), a transaction engine 136, and/or components thereof, although other configurations are also possible and contemplated. The first-party server 122 may be communicably connected with the network 102 via a wired or wireless connection, as illustrated by signal line 120.

The transaction engine 136 includes computer logic executable by processor(s) to provide an e-commerce service or marketplace for various items and may store and provide access to item information (e.g., images, descriptions, categories, specifications, reviews, ratings, retailers, etc.) in a data store. The transaction engine 136 may also generate orders and provide for order fulfillment for the items including order delivery status and item returns. For example, a user may place orders for and/or pay for items, such as office supplies, consumer electronics, other items, etc., ordered on an e-commerce marketplace embodied by the transaction engine 136 using a client device 106.

The web server (not shown) includes computer logic executable by processor(s) to processes content requests. The web server may include an HTTP server, a REST (representational state transfer) service, or other suitable server type. The web server may receive content requests (e.g., HTTP requests) from client devices 106, cooperate with the transaction engine 136 and/or UIC modeling engine 120 to determine the content, retrieve and incorporate data from a data store, format the content, and provide the content to the client devices.

In some instances, the web server may format the content using a web language, such as HTML, XML, JSON, or another suitable language, and provide the content to a corresponding client application 138 for processing and/or rendering to the user for display. The web server may also provide code scripts (e.g., JavaScript) in association with the content (e.g., web page) to provide various acts and/or functionality, such as components or aspects of the UIC modeling engine 120.

The third-party server 118 may include one or more computing devices having data processing, storing, and communication capabilities. For example, the third-party server 118 may include one or more hardware servers, server arrays, storage devices and/or systems, etc. In some implementations, the third-party server 118 may include one or more virtual servers, which operate in a host server environment and access the physical hardware of the host server including, for example, a processor, memory, storage, network interfaces, etc., via an abstraction layer (e.g., a virtual machine manager). In some implementations, the third-party server 118 may include a web server (not shown) for processing content requests, such as an HTTP server, a REST (representational state transfer) service, or other server type, having structure and/or functionality for satisfying content requests and receiving content from one or more computing devices that are coupled to the network 102 (e.g., the client device 106, etc.) as illustrated by signal line 116.

The third-party server 118 may host services such as a third-party application (not shown), which may be individual and/or incorporated into the services provided by the first-party server 122. In some implementations, the third-party application provides additional acts and/or information such as browsing history, tracking information, interaction data, profile data, shopping data, etc. In further implementations, data provided by the third-party application may alternatively and/or additionally be stored in and retrieved from data sources associated with the first-party server 122.

Figure 2:
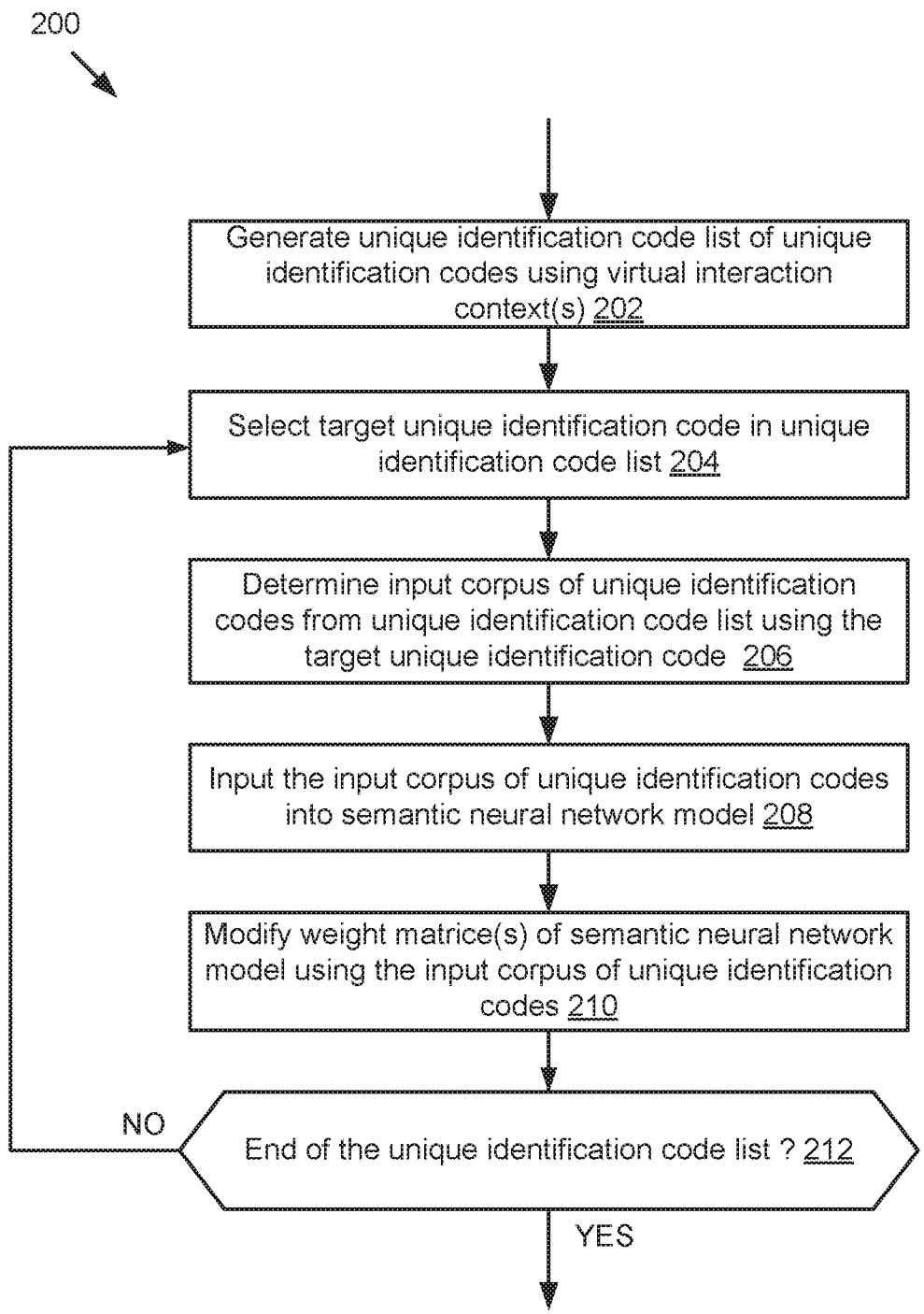
FIG. 2 is a flowchart of an example method for training a semantic neural network model using training examples determined from one or more virtual interaction contexts.

FIG. 2 is a flowchart of an example method 200 for training a semantic neural network model using training examples determined from one or more virtual interaction contexts (e.g., orders, shopping carts, interaction documents, etc.). In some embodiments, the training process may be performed at predetermined interval, for example, every three days, every week, every month, etc. In some embodiments, the training process may be performed at any time the first-party server 122 has available resources. In some embodiments, the training process may be performed when there is sufficient amount of training data aggregated from user activities on an online interaction system (e.g., the system 100), for example, when the number of unique identification code lists generated exceeds a determined or defined threshold (e.g., 1000). By continuously performing the training process on the semantic neural network model, the computing system 100 is automatically kept up to date on interaction trends of its users without user intervention, and advantageously makes use of the often massive amount of data related to user activities occurring on the online interaction service that otherwise goes unprocessed.

Figure 5:
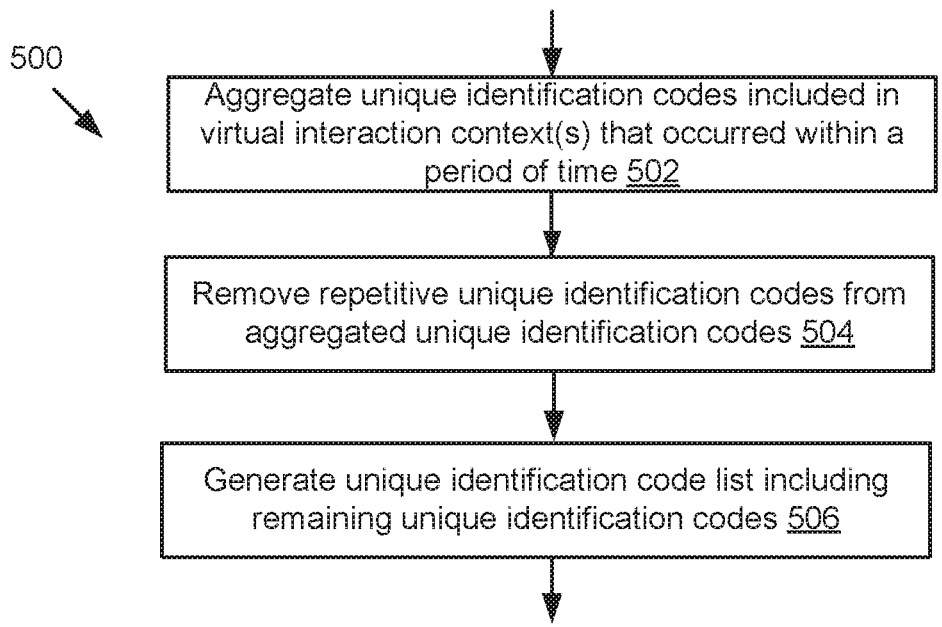
FIG. 5 is a flowchart of an example method for generating a unique identification code list.

In block 202, the UIC modeling engine 120 generates a list of unique identification codes associated with one or more virtual interaction contexts (e.g., as described in further detail elsewhere herein, for example, in reference to FIG. 5). For example, the UIC modeling engine 120 aggregates unique identification codes of interaction items included in the same shopping cart, browsed in the same session, appearing in the same user-generated registry list for a particular event such as birthday, baby shower or wedding shower, etc. In some embodiments, the UIC modeling engine 120 may also generate and set apart one or more verification sets of unique identification codes for verification of the trained model.

In block 204, the UIC modeling engine 120 selects a target unique identification code in the generated unique identification code list. The target unique identification code may be selected based on one or more factors such as price, popularity, margin, customer reviews, a business decision, etc., or may even be selected sequentially or arbitrarily.

In block 206, the UIC modeling engine 120 may determine an input set of unique identification codes from the unique identification code list using the target unique identification code. The input set may include the target unique identification code and context unique identification codes associated with the target unique identification code. Determination of the input set is described in further detail elsewhere herein, such as in reference to FIGS. 4-7C.

Figure 3:
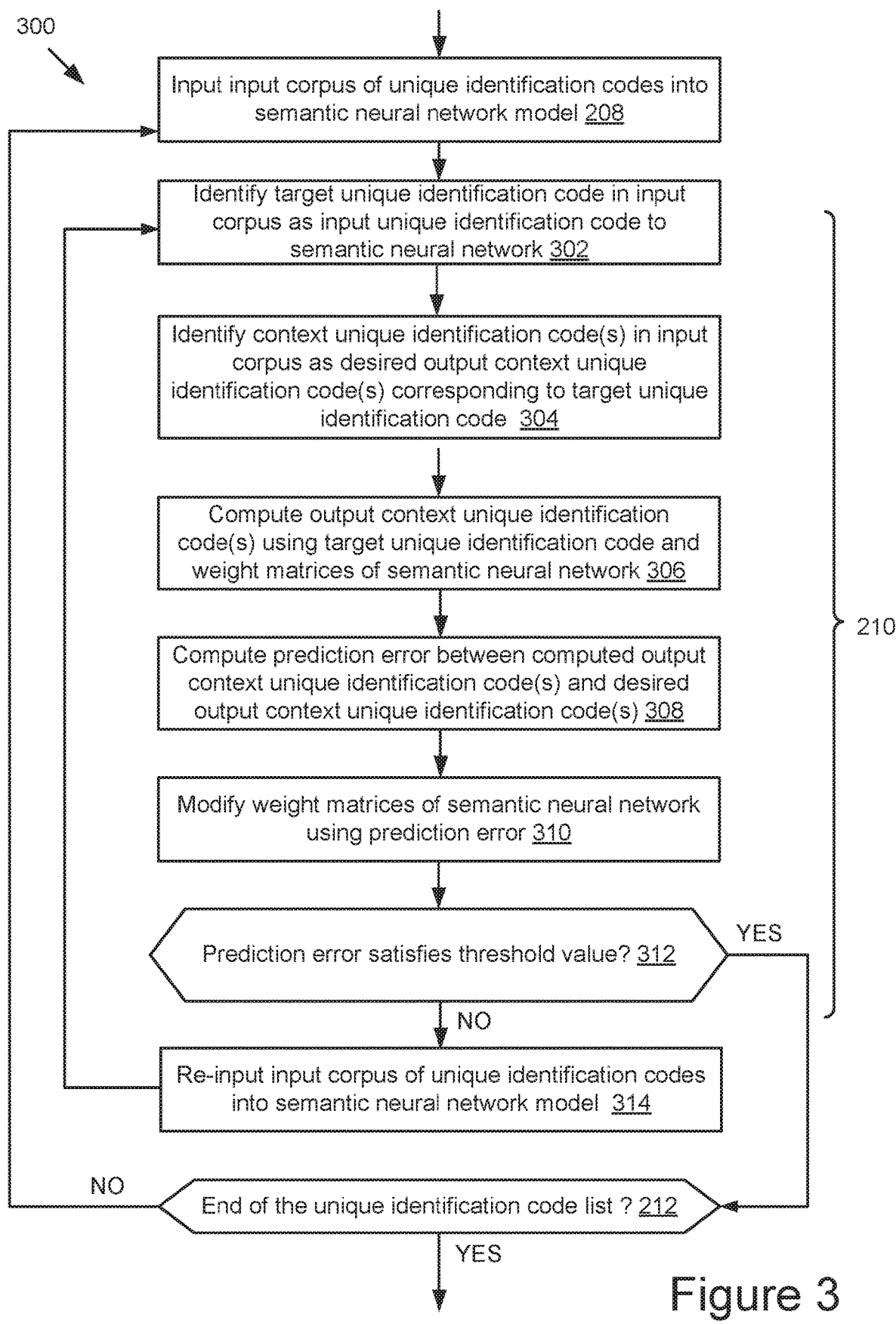
FIG. 3 is a flowchart of an example method for modifying weight matrices of the semantic neural network model using input sets of unique identification codes as a set of training examples.

In block 208, the UIC modeling engine 120 may input the input set into a semantic neural network model as a training example, and in block 210, the UIC modeling engine 120 may modify one or more weight matrices of the semantic neural network model using the input set of unique identification codes (e.g., using the back propagation algorithm), as described in further detail in FIG. 3. The UIC modeling engine 120 may then continue to train the semantic neural network model by repeating the operations 204-210 until reaching 212 the end of the unique identification code list. For example, if, at 212, the UIC modeling engine 120 determines that there are additional unique identification codes in a unique identification code list for which to perform the training, the UIC modeling engine 120 may return to 204 and continue iterating the method until it has reached the end of the unique identification code list.

FIG. 3 is a flowchart of an example method 300 for modifying weight matrices of the semantic neural network model using input sets as training examples. In some embodiments, the semantic neural network model may include a SkipGram model and/or CBOW (Continuous Bag of Words) model. In block 208, the UIC modeling engine 120 inputs an input set of unique identification codes into the semantic neural network model. In block 302, the UIC modeling engine 120 may identify the target unique identification code in the input set as the input unique identification code to the semantic neural network model. In block 304, the UIC modeling engine 120 may identify the context unique identification codes in the input set as desired output context unique identification codes corresponding to the target unique identification code (e.g., using a natural language processing and/or a neural network model, as described elsewhere herein).

FIG. 8 illustrates an example of a neural network model. As shown, a neural network model may include an input layer 802, an output layer 804, and one or more hidden layers 806 in between. Each hidden layer may include one or more hidden units (e.g. one or more neurons). The semantic neural network model may use one hidden layer and the number of neurons in the hidden layer may be a selectable parameter. The weights between the input layer and the output layer of the neural network model may be represented by one or more weight matrices. As an example, assume that the input set includes V non-repetitive unique identification codes with one target unique identification code and (V−1) context unique identification codes corresponding to the target unique identification code. The hidden layer size is referred to as N to signify that the hidden layer includes N neurons.

The weights between the input layer and hidden layer may be presented by a V×N matrix W and the weights between the hidden layer and the output layer may be presented by a N×V matrix W'. In some embodiments, the weight matrices W and W' may be initialized to random weights. In some embodiments, the weight matrices W and W' may be initialized to random weights such that these weight matrices are not easily saturated. In some embodiments, each row of the matrix W is an N-dimensional vector representation $v_w$ of the corresponding unique identification code in the input set and the input vector at the input layer is a V-dimensional one-hot encoded vector indicating position of the target unique identification code in the input set.

For example, the one-hot encoded vector has one element corresponding to the target unique identification code being set to 1, and other elements of the encoded input vector may be set to 0. In some embodiments, the element of matrix W' between the hidden layer and the output layer may be adjusted using the input set. For example, an update equation to matrix W' may be calculated using the target unique identification code as an input vector and the context unique identification codes associated with the target unique identification codes as desired output vectors.

In a further example, the input layer may be a one-hot encoded vector that is a lookup for the corresponding $h_i$ vector in the $W_{V \times N}$ matrix, which is multiplied by the weights of the next layer of the matrix $W'_{N \times V}$. The results may then be normalized by a normalization function (e.g., the softmax function or normalized exponential function, as shown below in Equation 2). In this example, the $V_c$ vectors are the context representations of unique identification codes.

$$e^{V_c \cdot h_i} / \Sigma_{c' \in C} e^{V_{c'} \cdot h_i} \qquad (2)$$

The normalization can, in some cases, be computationally expensive, because it normalizes by the resulting probabilities of the possible unique identification codes that can appear in the context. A lighter-weight alternative algorithm at the last layer called Negative Sampling can be used, which samples the unique identification code "universe" for negative examples to present to the algorithm. This changes the optimization function to:

$$\arg\max_\theta \log \Pi_{(sku,context) \in sku\_lists} p(\text{in}_{context}=1|sku,c; \theta) * \log \Pi_{(sku,context) \in negative\_examples} p(\text{in}_{context}=0|sku,c;\theta) \qquad (3)$$

The above approach is beneficial because it uses parameters that can optimize the model to predict the probability that the unique identification code and its context unique identification codes will occur together, and allows the model to give low probabilities for the unique identification code and negatively sampled unique identification codes.

In the above example, the conditional probability can be obtained by applying the sigmoid function to the dot product of the hidden layer output with the weights of the next layer:

$$p(\text{in}_{context}=\{1,0\}|sku,c;\theta) = 1/1+e^{-h_i \cdot v_c} \qquad (4)$$

The weights may be adjusted using the back-propagation algorithm based on the current weights of the model and how close the model's predictions are to the actual context unique identification codes. The algorithm may process each unique identification code in the unique identification code "universe," or may run for a specified number of iterations processing certain unique identification codes. For example, in some implementations, the training process may run for a defined number of iterations and the validity of the weight matrices may then be verified using one or more verification sets or lists of unique identification codes to check the accuracy or prediction error of the trained model and weight matrices.

Figure 4:
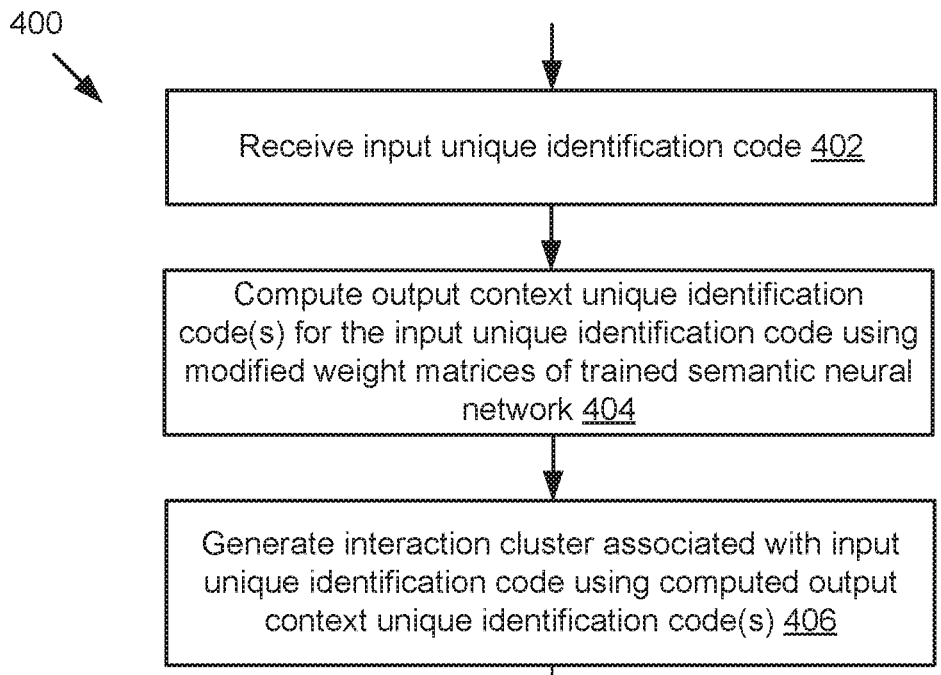
FIG. 4 is a flowchart of an example method for generating an interaction cluster associated with an input unique identification code at runtime.
Figure 6:
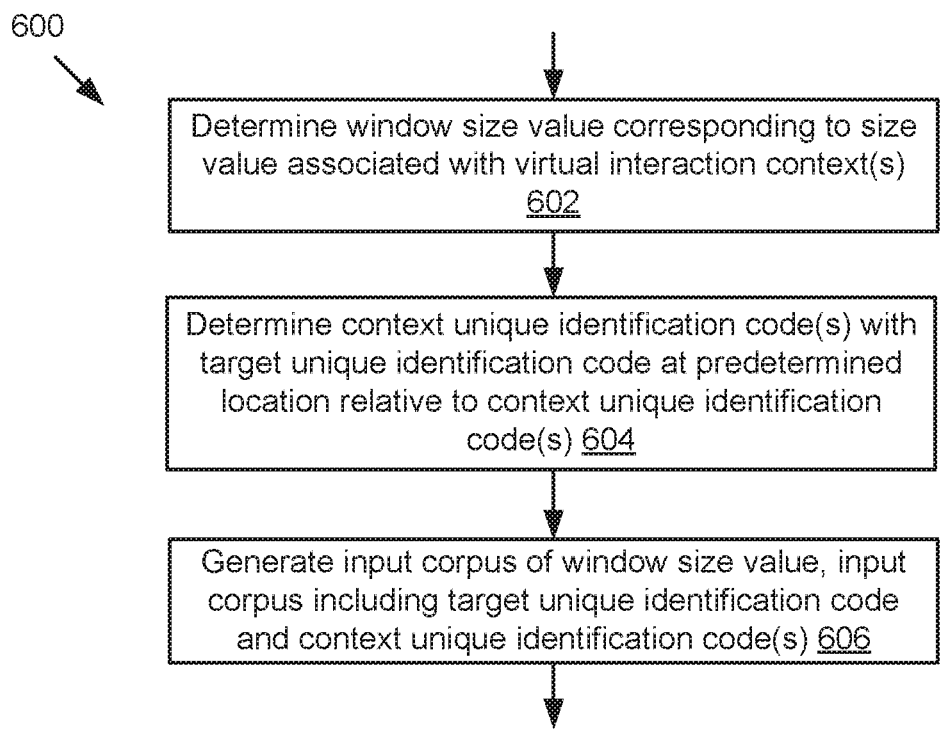
FIG. 6 is a flowchart of an example method for generating one or more input sets from the unique identification code list.

Referring again to FIG. 3, in block 306, UIC modeling engine 120 computes the output context unique identification codes for the target unique identification code using the weight matrices of the semantic neural network, for example, the input-hidden matrix W and the current hidden-output matrix W' (e.g., as described elsewhere herein, such as in reference to FIGS. 4-6).

In block 308, UIC modeling engine 120 computes the prediction error between the output context unique identification codes computed in block 306 and the desired output context unique identification codes (e.g., the context unique identification codes provided to the neural network model in the input set). For example, a prediction error may be calculated using one or more validation sets or lists set apart from the training sets/lists of unique identification codes prior to training the model/weight matrices.

In block 310, the UIC modeling engine 120 may modify the weight matrices of the semantic neural network model using the prediction error. For example, the UIC modeling engine 120 may compute the update equation to hidden-output matrix W' based on the prediction error (e.g., using the delta rule or general back propagation). In other words, the UIC modeling engine 120 may adjust the weights of the neural network model according to how well the output context unique identification codes it predicted for a particular target unique identification code using current weight matrices match the "actual" context unique identification codes (e.g., the context unique identification codes in the input set).

In block 312, the UIC modeling engine 120 determines whether the prediction error satisfies a threshold value. If the prediction error does not satisfy the threshold value, in block 314, the UIC modeling engine 120 may re-input the input set of unique identification codes into the neural network model to train the neural network defined number of additional times (e.g., one or more) with the same training example. The weight matrices of the neural network model, which were modified in block 310 using the input set of unique identification codes, may now be modified again using the same input set. Accordingly, the UIC modeling engine 120 may repeat the operations 302-312. In some embodiments, the neural network model may be trained with the same input set for a specified number of iterations. In some embodiments, the input set may be fed to the neural network model as a training example until the prediction error does not change more than a threshold amount. If the prediction error does satisfy the threshold value, the UIC modeling engine 120 may then continue to train the semantic neural network model with another input set by repeating the operations 208-314 until reaching 212 the end of the unique identification code list.

FIG. 4 is a flowchart of an example method 400 for generating an interaction cluster associated with an input unique identification code at runtime. For example, an interaction cluster may be a cluster of unique identification codes that are likely to appear in context with one another or with a target unique identification code (e.g., a printer may be likely to appear with ink, other printers, and printer accessories). In block 402, the UIC modeling engine 120 receives an input unique identification code. For example, a user may browse to a particular item in an online interaction session, at which point the unique identification code of the particular item may be identified as the input unique identification code for which context unique identification codes are to be determined. For example, a user may browse to a product page on an online store, at which point a unique identification code corresponding to the product may be input as the input unique identification code.

In block 404, the UIC modeling engine 120 computes the output context unique identification codes for the input unique identification code using the weight matrices of the semantic neural network. In some embodiments, the weight matrices have been modified through the training process as described above with reference to FIG. 3.

In block 406, UIC modeling engine 120 may generate an interaction cluster associated with the input unique identification code using the output context unique identification codes computed in block 404. The interaction cluster includes one or more interaction items corresponding to the output context unique identification codes, and can be used for various purposes as discussed elsewhere herein. For example, the interaction cluster may include one or more unique identification codes representing items that may be cross-sold, upsold, or otherwise recommended to a user who selected the input unique identification code.

FIG. 5 is a flowchart of an example method 500 for generating a unique identification code list. In block 502, the UIC modeling engine 120 may aggregate unique identification codes included in virtual interaction contexts that occur within a period of time. For example, the UIC modeling engine 120 aggregates unique identification codes of interaction items included in the same webpage, interaction document, or shopping cart, browsed in the same session, appearing in the same user-generated registry list for a particular event such as birthday, baby shower or wedding shower, etc. In some embodiments, the UIC modeling engine 120 may combine virtual interaction contexts during a time period to generate a list of unique identification codes. For example, the UIC modeling engine 120 may combine unique identification codes in the interaction documents, shopping carts, and/or browsing sessions associated with a user within seven days into a single unique identification code list. As another example, the unique identification code list may include or exclude unique identification codes that the user buys or views during a particular shopping season, such as Black Friday and Cyber Monday.

In some embodiments, the length of the time period during which the unique identification codes are collected may depend on the level of activity associated with the user. For example, a user A regularly uses the online interaction service and considers approximately 150 items per week, the UIC modeling engine 120 combines unique identification codes associated with user A's activities within 4 days into a list of unique identification codes. On the other hand, user B does not use the online interaction service very often and reviews about 15 items per month, the UIC modeling engine 120 combines unique identification codes associated with user B's activities within 2 months into one unique identification code list. The number of unique identification codes in the list of unique identification codes associated with different users may be different.

In block 504, the UIC modeling engine 120 may remove the repetitive unique identification codes from the aggregated unique identification code lists and, in block 506, the UIC modeling engine 120 may generate a list of unique identification codes from the remaining unique identification codes. For example, on October 15, a user viewed Staples® copy paper and Universal® copy paper and, on October 20, decided to buy two boxes of the Staples® copy paper. The UIC modeling engine 120 aggregates unique identification codes from the purchase history and browsing history of the user for a two week period, for example, from October 11 to October 25, to generate a corresponding unique identification code list associated with that particular user. In this example, the unique identification code of Staples® copy paper appears twice in the unique identification code list, so the UIC modeling engine 120 removes one instance of the unique identification code from the list of unique identification codes.

In some embodiments, the UIC modeling engine 120 may also remove repurchased unique identification codes as they might be considered out of context with regard to other interaction items included in the same shopping carts or browsed in the same session as the repurchased item corresponding to the unique identification code. For example, the user likes a specific brand of paper towel and buys 2 rolls every month together with other items, so the UIC modeling engine 120 may remove unique identification codes of this paper towel from the unique identification code list, because once this unique identification code is selected as target unique identification code, the other items in the aggregated list of unique identification codes may not provide context for the purchase of the paper towel. Accordingly, unique identification codes of other items may not be considered desired output context unique identification codes corresponding to the target unique identification code and may not be provided to the neural network model together with the target unique identification code as a training example.

In some embodiments, the UIC modeling engine 120 may also remove unique identification codes in the wish list and unique identification codes in the favorite list of the user from the list of aggregated unique identification codes because other unique identification codes in the list may not provide interaction context for these unique identification codes. For example, a user wishes to buy a tablet as Christmas gift for his brother, so the user checks the price of his desired tablet to look for good deals every time he uses an online shopping service to shop for other items. The UIC modeling engine 120 removes unique identification code of the tablet from the list of unique identification codes aggregated from activities of the user for these other sessions to prevent the unique identification code of the tablet from skewing the training of the weight matrices of the semantic model. Other examples of unique identification codes excluded from the unique identification code list are possible and contemplated.

Figure 7A:
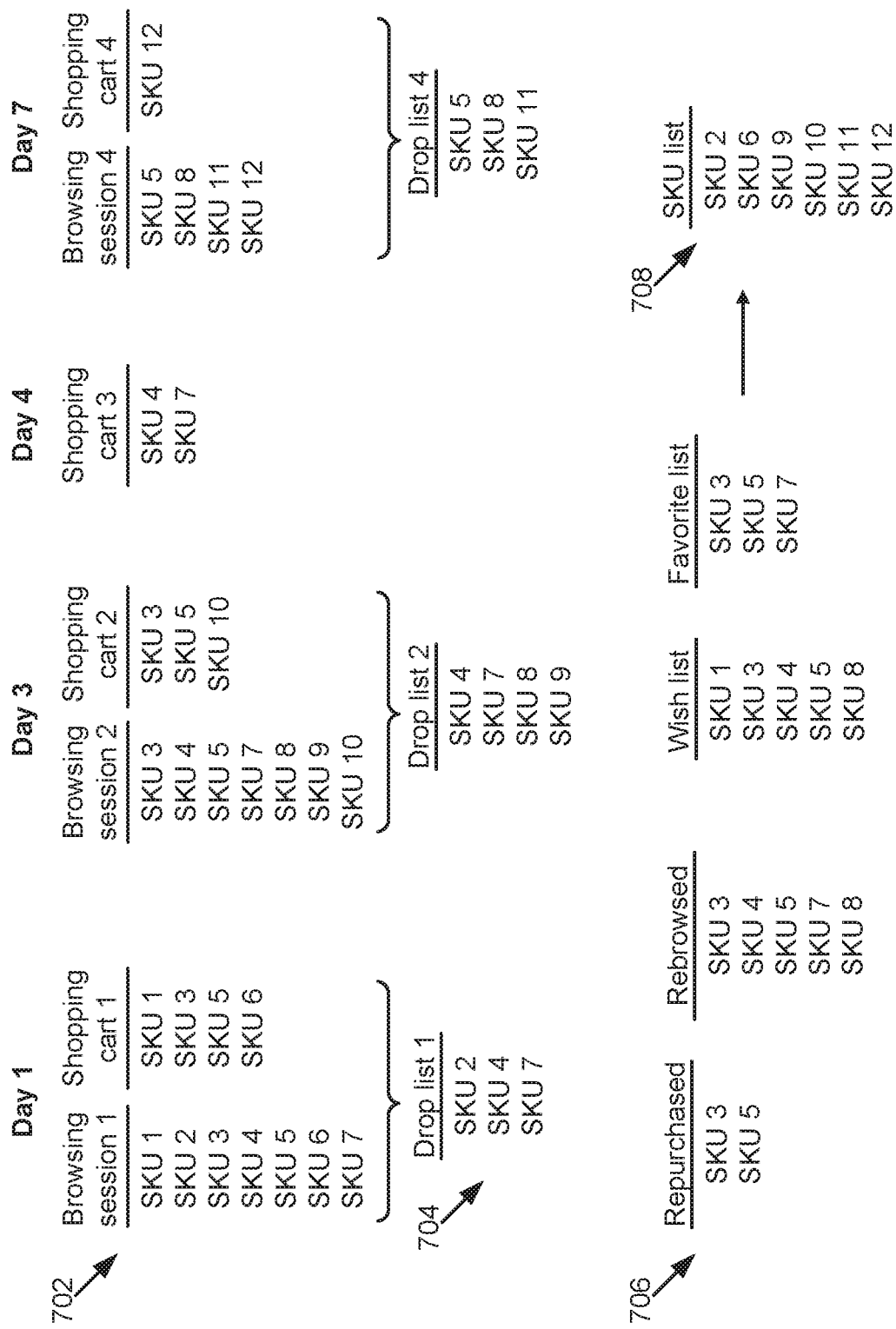

Referring now to FIG. 7A, an example of generating a list of unique identification codes is shown in more detail in an example embodiment using SKUs. The UIC modeling engine 120 may aggregate user activities associated with a user on one or more online interaction services for a period of time. For example, the UIC modeling engine 120 may aggregate browsing history, purchase history, and shopping carts of the user for a period of 10 days. During these 10 days, the user(s) use the online interaction service on day 1, day 3, day 4, and day 7. On day 1, the user(s) browse seven interaction items represented by SKU 1-SKU 7 (e.g., a particular type of unique identification code), but eventually only adds four items SKU 1, SKU 3, SKU 5, and SKU 6 to the shopping cart and drops three items SKU 2, SKU 4, and SKU 7. In this example, the user(s) is/are assumed to check out and purchase the interaction items included in the shopping cart, but it should also be understood that the user could remove items from a shopping cart, save them for later, etc. It should be understood that this example may apply to a single user's interaction contexts, or a plurality of users. With a plurality of users, the system may identify users that have various similarities (demographic, geographic, business-related, item-related, interaction behavior models, etc.) across multiple interaction sessions and the depicted contexts may apply across those users. Other variations are also possible and contemplated. Generating a unique identification code list based on interaction behaviors of a plurality of users is advantageous in providing interaction recommendations for new users as the system may not have enough historical interaction behaviors associated with these new users to train the weight matrices/semantic models based on these new users' interactions alone.

Continuing the above example, on day 3, the user browses interaction items SKU 3, SKU 4, SKU 5, SKU 7, SKU 8, SKU 9, and SKU 10, but eventually only adds three items SKU 3, SKU 5, and SKU 10 to the shopping cart and drops four items SKU 4, SKU 7, SKU 8, and SKU 9. On day 4, the user does not browse through different items but adds SKU 4 and SKU 7 directly to the shopping cart for purchase. On day 7, the user browses interaction items SKU 5, SKU 8, SKU 11, and SKU 12, but eventually buys only SKU 12 and abandons the rest of the browsed interaction items.

Based on the interaction behaviors of the user during these 10 days, the UIC modeling engine 120 determines that the user repurchases SKU 3 and SKU 5, and re-browses SKU 3, SKU 4, SKU 5, SKU 7, and SKU 8. In some embodiments, the UIC modeling engine 120 determines drop lists 704 which include abandoned unique identification codes in each interaction session. The drop lists may be used to determine positive training examples and/or negative training examples provided to the neural network model as described further herein. In some embodiments, the interaction session begins when a user starts using the online interaction service and continues until the user logs out. The user may anonymously crawl through different items and may be prompted to login to his account only before placing an order, reviewing a shipped order, or performing other activities that require authentication. In some embodiments, the interaction session may automatically timeout after a duration of inactivity. The UIC modeling engine 120 determines that the drop list 1 of day 1 includes SKU 2, SKU 4, SKU 7, the drop list 2 of day 3 includes SKU 4, SKU 7, SKU 8, SKU 9, and the drop list 4 of day 7 includes SKU 5, SKU 8, SKU 11. Day 4 does not have a drop list because the user does not browse items in day 4 but directly adds SKU 4 and SKU 7 to his shopping cart. In the above example, the UIC modeling engine 120 also determines that SKU 1, SKU 3, SKU 4, SKU 5, and SKU 8 are included in the wish list of the user and SKU 3, SKU 5, and SKU 7 are included in the favorite list of the user. In the above example, for easy explanation, it is assumed that the user activities on each day occurred within separate interaction sessions.

As described above with reference to FIG. 5, the UIC modeling engine 120 may remove all but one repetitive unique identification code from the list of aggregated unique identification codes (e.g., those unique identification codes appear in both browsing sessions and shopping carts, unique identification codes being re-browsed, etc.). In some embodiments, the UIC modeling engine 120 also eliminates repurchased unique identification codes, unique identification codes in the wish list of the user, and unique identification codes in the favorite list of the user from the list of aggregated unique identification codes. The UIC modeling engine 120 generates a unique identification code list 708 from the remaining unique identification codes and provides the unique identification code list 708 to the semantic neural network model as a training example. In the above example, the unique identification code list 708 provided as input to the neural network model includes SKU 2, SKU 6, SKU 9, SKU 10, SKU 11, and SKU 12.

FIG. 6 is a flowchart of an example method 600 for generating one or more input sets from the list of unique identification codes generated as described above in reference to FIG. 5. In some embodiments, each input set may be considered as one training example provided to the semantic neural network model to modify its weight matrices. In block 602, the UIC modeling engine 120 may determine the window size value of the input set. In some embodiments, the window size value may be the length of the input set, e.g. the number of contextual unique identification codes included in the input set. For example, the window size may define how much of the unique identification code list is included in an input set. In some embodiments, the UIC modeling engine 120 may dynamically determine the window size value of the input set corresponding to the size value of the virtual interaction context associated with the user. For example, if a first user usually has a significant number of interaction items in the interaction document (e.g., a shopping cart) or usually browses a lot of similar items before deciding which item to interact with or buy, the UIC modeling engine 120 may determine the window size value for the first user larger than the window size value for a second user who often purchases a small number of items at a time or usually reviews only few search results or recommendations provided for each item of his interest. In some embodiments, the window size value may be determined based on the size of the unique identification code list from which the input set may be generated. In some embodiments, the window size value of the input set may be defined proportionally to the size of the unique identification code list. For example, if the unique identification code list includes 20 unique identification codes, the UIC modeling engine 120 may determine the window size value to be 5 unique identification codes. In some embodiments, the window size value of the input set may also be the dimensions of the input vector and output context vectors at the input layer and output layer of the semantic neural network model.

In block 604, the UIC modeling engine 120 may determine context unique identification codes for the target unique identification code (e.g., based on the window size). In block 606, the UIC modeling engine 120 may generate an input set from the determined context unique identification codes and the target unique identification code. In some embodiments, for each unique identification code selected as target unique identification code in the unique identification code list, the unique identification codes adjacent to that target unique identification code in the unique identification code list may be considered context unique identification codes associated with the target unique identification code.

As a further example of the methods described herein, the following non-limiting example is provided. In some embodiments, the UIC modeling engine 120 builds a unique identification code document (e.g., unique identification code dictionary) of the unique identification codes that appear in the input set. If using negative sampling (as described below), the UIC modeling engine 120 may build a negative sampling distribution based on a transformation of raw counts of the unique identification codes in the corpus. The UIC modeling engine 120 initializes the neural network architecture. The number of neurons of the model at each layer may be determined by the size of the unique identification code dictionary, and the hidden layer size (e.g., as configured). The UIC modeling engine 120 initializes the neural network weight matrices $W'_{N \times V}$ and $W_{V \times N}$ to random weights. It should be noted that the neurons in the network may become easily saturated, so the initialized weights may be set within a defined range.

The UIC modeling engine 120 may begin by training the network by iterating through the corpus of documents. For each document, the UIC modeling engine 120 may move a sliding window over the document. The sliding window size may be a context size parameter configured by the user or system. In some embodiments, the sliding window's center is the input unique identification code, and the rest of the unique identification codes are its context. The UIC modeling engine 120 may perform a forward pass using the input unique identification code through the neural network, to get the network's context unique identification code predictions for the current input unique identification code. The UIC modeling engine 120 adjusts the weights of the network according to how well its predictions match the "actual" context of the current unique identification code, according to the back propagation algorithm and stochastic gradient descent (SGD). The UIC modeling engine 120 can iterate through the corpus a fixed number of times, or until the error and gradients do not change more than a threshold number, for example.

Referring to FIG. 7B as a further example, the method 600 may collect unique identification codes to determine unique identification code co-occurrences in various contexts, such as unique identification codes in the same cart, unique identification codes browsed in the same session, etc. The method 600 processes each unique identification code co-occurrence list as a document, and uses the co-occurring unique identification codes as context unique identification codes corresponding to a particular target unique identification code. For example, assume that the unique identification code list 750 is generated and provided as a document from which the input sets are determined. Also as an example, assume that the UIC modeling engine 120 determines that the window size value 754 for the input set is seven (e.g., each input set includes seven unique identification codes) and selects unique identification code 752 as the target unique identification code.

In some embodiments, one or more (e.g., each) unique identification code in the unique identification code list may be selected as target unique identification code and an input set for that target unique identification code may be determined. In other words, the algorithm can traverse the list of unique identification codes 750 making each unique identification code in the list a target unique identification code in a given pass. In the example of 7B, the UIC modeling engine 120 identifies six unique identification codes proximate target unique identification code 752 as context unique identification codes 754. Continuing the above example, the UIC modeling engine 120 groups six context unique identification codes identified and the target unique identification code 752 to generate input set 756. In some embodiments, the target unique identification code may be at a predetermined position relative to the context unique identification codes. For example, the target unique identification code may be in the center of the input set. In another example, the target unique identification code may be the third unique identification code of the input set.

In some embodiments, the UIC modeling engine 120 starts with the first unique identification code of the unique identification code list as a target unique identification code, generates the input set for that first unique identification code, and moves to the next unique identification code in the unique identification code list. In other words, the UIC modeling engine 120 moves a sliding window of the window size value along the unique identification code list and generates multiple input sets correspondingly.

The unique identification code list may be considered a vocabulary document and the input sets may be considered training examples generated from the vocabulary document as the sliding window moves along the document. The input sets may be input to the neural network model to modify weight matrices of the neural network model, as described elsewhere herein.

In some embodiments, the weight matrices may be modified to maximize the probability that the target unique identification code and corresponding context unique identification codes appear together. Because the target unique identification code and context unique identification codes occur together in the same interaction context, and may be thus included in an input set, the input set may therefore considered to include positive training examples to the neural network model.

In some embodiments, the probability that the target unique identification code and corresponding context unique identification codes appear together may be determined by applying sigmoid function to the dot product of vector output at hidden layer $h_i$ with the weights of hidden-output weight matrix W' as provided below:

$$p(in_{context}=\{1,0\}|sku,c;\theta)=1/1+e^{-h_i \cdot v_c} \quad (5)$$

In some embodiments, the UIC modeling engine 120 may combine virtual interaction contexts during a time period to generate the unique identification code list. For example, the UIC modeling engine 120 may combine unique identification codes in the shopping carts and browsing sessions associated with a user within seven days into a single unique identification code list. As another example, the unique identification code list may include or exclude unique identification codes that the user buys or views during a shopping season such as Black Friday and Cyber Monday.

FIG. 7C is a diagram illustrating various preprocessing operations for the unique identification code lists. As shown, the system can preprocess the unique identification code lists and then pass them to an appropriate NLP-based algorithm (as described above), based on the final purpose of the representation. The NLP-based algorithm may be configured with the SkipGram model using Negative Sampling (SGNS) network architecture having 96 dimensions in the hidden layer, for example. In some embodiments, the system may cluster one or more context unique identification codes with the target unique identification code based on electronic sale channels associated with the target unique identification code to generate the input set. Examples of electronic sale channels include but are not limited to up-sell strategy, cross-sell strategy, and/or general occurrence. Other recommendations and/or selling purposes are possible and contemplated.

Continuing the example described in FIG. 7A, assume that the target unique identification code is SKU 5. As depicted in the first row 792, for the purpose of upsell clustering, positive examples for SKU 5 may be other unique identification codes that are browsed in the same browsing session, in which none or only one of the browsed unique identification codes are eventually bought. Negative examples for upsell strategy can be unique identification codes that are co-bought together with SKU 5, along with other unique identification codes proposed by the negative sampling algorithm. Example of unique identification codes proposed by the negative sampling algorithm may include unique identification codes that do not usually occur together in user interaction context. For example, if it is determined that paper is not commonly purchased together with toner, so unique identification codes corresponding to paper and toner can be used as a negative example input to the NLP-based algorithm to train the neural network model.

As depicted in the second row 794, for the purpose of cross-sell clustering, positive examples for SKU 5 may be other unique identification codes that are bought after SKU 5 are bought, within some time period. An example of time period may be five days.

As depicted in the third row 796, for the purpose of co-occurrence clustering, unique identification codes in the same cart and/or unique identification codes browsed in the same browser session can be used to generate the unique identification code documents (e.g., the training examples provided to the neural network). For example, each group of other unique identification codes that are browsed in the same session or included in the same shopping cart with SKU 5 may be considered a positive example associated with SKU 5. Each group of other unique identification codes that are browsed together with SKU 5 but eventually dropped may be considered a negative example associated with SKU 5.

In the above examples, learned 96-dimensional vectors for each target unique identification code may be projected into 2 dimensions using the T-SNE algorithm. In some embodiments, the visualization may be a scatter plot, where each point in the plot represents a unique identification code. In some embodiments, other information associated with the unique identification code, e.g. the item name, may be displayed when the point corresponding to that particular unique identification code is selected or hovered over. In some embodiments, clusters of points in the plot may represent similar unique identification codes. Different unique identification code "divisions" or unique identification code group may be represented using different colors.

As discussed elsewhere herein, the learned vector representation for computing similar unique identification codes may be used directly for upsell, cross-sell/bundles, and for grouping related unique identification codes with each other. These vectors can also be used as an input to other machine learning algorithms, such as purchase prediction, user purchase/browsing sequence modeling, etc.

It should be understood that the described system is representative of an example system and that a variety of different system environments and configurations are contemplated and are within the scope of the present disclosure. For example, various acts and/or functionality may be moved from a server to a client, or vice versa, data may be consolidated into a single data store or further segmented into additional data stores, and some embodiments may include additional or fewer computing devices, services, and/or networks, and may implement various functionality client or server-side. Further, various entities of the system may be integrated into a single computing device or system or divided into additional computing devices or systems, etc.

In the above description, for purposes of explanation, numerous specific details are set forth in order to provide a thorough understanding of the present disclosure. However, it should be understood that the technology described herein can be practiced without these specific details. Further, various systems, devices, and structures are shown in block diagram form in order to avoid obscuring the description. For example, various implementations are described as having particular hardware, software, and user interfaces. However, the present disclosure applies to any type of computing device that can receive data and commands, and to any peripheral devices providing services. Thus, it should be understood that a variety of different system environments and configurations are contemplated and are within the scope of the present disclosure. For example, various functionality may be moved from a server to a client, or vice versa and some embodiments may include additional or fewer computing devices, services, and/or networks, and may implement various functionality client or server-side. Further, various entities of the described system(s) may be integrated into to a single computing device or system or additional computing devices or systems, etc. In addition, while the system 100 described in reference to FIG. 1 provides an example of an applicable computing architecture, it should be understood that any suitable computing architecture, whether local, distributed, or both, may be utilized in the system 100.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that these and similar terms are to be associated with the appropriate physical quantities and are merely convenient labels applied to these quantities. Unless specifically stated otherwise as apparent from the following discussion, it is appreciated that throughout this disclosure, discussions utilizing terms including "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Various implementations described herein may relate to a computing device and/or other apparatus for performing the operations herein. This computing device may be specially constructed for the required purposes, or it may comprise a general-purpose computer selectively activated or reconfigured by a computer program stored in the computer. Such a computer program may be stored in a computer readable storage medium, including, but is not limited to, any type of disk including floppy disks, optical disks, CD-ROMs, and magnetic disks, read-only memories (ROMs), random access memories (RAMS), EPROMs, EEPROMs, magnetic or optical cards, flash memories including USB keys with non-volatile memory or any type of media suitable for storing electronic instructions, each coupled to a computer system bus.

The technology described herein can take the form of a hardware implementation, a software implementation, or implementations containing both hardware and software elements. For example, the technology may be implemented in executable software, which includes but is not limited to an application, firmware, resident software, microcode, etc. Furthermore, the technology can take the form of a computer program product accessible from a computer-usable or computer-readable medium providing program code for use by or in connection with a computer or any instruction execution system. For the purposes of this description, a computer-usable or computer readable medium can be any non-transitory storage apparatus that can contain, store, communicate, propagate, or transport the program for use by or in connection with the instruction execution system, apparatus, or device.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Communication unit(s) (e.g., network interfaces, etc.) may also be coupled to the system to enable the data processing system to become coupled to other data processing systems, storage devices, remote printers, etc., through intervening private and/or public networks, such as the network 202.

Wireless (e.g., Wi-Fi™) transceivers, Ethernet adapters, and modems, are just a few examples of network adapters. The private and public networks may have any number of configurations and/or topologies. Data may be transmitted between these devices via the networks using a variety of different communication protocols including, for example, various Internet layer, transport layer, or application layer protocols. For example, data may be transmitted via the networks using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), Web Socket (WS), wireless access protocol (WAP), various messaging protocols (SMS, MMS, XMS, IMAP, SMTP, POP, WebDAV, etc.), or other known protocols.

Finally, the structure, algorithms, and/or interfaces presented herein are not inherently related to any particular computer or other apparatus. Various general-purpose systems may be used with programs in accordance with the teachings herein, or it may prove convenient to construct more specialized apparatus to perform the required method blocks. The required structure for a variety of these systems will appear from the description above. In addition, the specification is not described with reference to any particular programming language. It will be appreciated that a variety of programming languages may be used to implement the teachings of the specification as described herein.

The foregoing description has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions and/or formats.

Furthermore, the modules, routines, features, attributes, methodologies, and other aspects of the disclosure can be implemented as software, hardware, firmware, or any combination of the foregoing. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future. Additionally, the disclosure is in no way limited to implementation in any specific programming language, or for any specific operating system or environment.

What is claimed is:

1. A computer-implemented method comprising:
   aggregating, using one or more computing devices, a list of unique identification codes corresponding to items interacted with in one or more virtual interaction contexts occurring within a predetermined period of time;
   removing, using the one or more computing devices, one or more repetitive unique identification codes from the list of unique identification codes;
   selecting, using the one or more computing devices, a unique identification code in the list of unique identification codes as a target unique identification code;
   determining, using the one or more computing devices, whether a number of unique identification codes in the list of unique identification codes satisfies a predetermined threshold;
   responsive to determining that the number of unique identification codes in the list of unique identification codes satisfies the predetermined threshold, determining, using the one or more computing devices, an input set of unique identification codes from the list of unique identification codes, the input set of unique identification codes including the target unique identification code and one or more context unique identification codes;
   inputting, using the one or more computing devices, the input set of unique identification codes into a semantic neural network model, the semantic neural network model including one or more weight matrices; and
   maximizing, using the one or more computing devices, a probability that the target unique identification code occurs together with the one or more context unique identification codes in an interaction cluster by modifying the one or more weight matrices of the semantic neural network model based on inputting the input set of unique identification codes into the semantic neural network model.

2. The computer-implemented method of claim 1, wherein inputting the input set of unique identification codes into the semantic neural network model further includes:
   identifying, using the one or more computing devices, the target unique identification code as an input unique identification code to the semantic neural network model, and
   identifying, using the one or more computing devices, the one or more context unique identification codes as desired output context unique identification codes of the semantic neural network model corresponding to the target unique identification code.

3. The computer-implemented method of claim 2, wherein modifying the one or more weight matrices of the semantic neural network model includes:
   computing, using the one or more computing devices, one or more first output context unique identification codes using the target unique identification code and the one or more weight matrices,
   computing, using the one or more computing devices, a prediction error using the one or more computed first output context unique identification codes and the desired output context unique identification codes,
   modifying, using the one or more computing devices, the one or more weight matrices of the semantic neural network model using the prediction error,
   determining, using the one or more computing devices, whether the prediction error satisfies a threshold value, and
   responsive to the prediction error not satisfying the threshold value, re-inputting, using the one or more computing devices, the input set of unique identification codes into the semantic neural network model associated with the one or more modified weight matrices.

4. The computer-implemented method of claim 3, further comprising:
   receiving, using the one or more computing devices, an input target unique identification code,
   computing, using the one or more computing devices, one or more second output context unique identification codes for the input target unique identification code using the input target unique identification code and the one or more modified weight matrices, and
   generating, using the one or more computing devices, an interaction cluster associated with the input target unique identification code using the one or more computed second output context unique identification codes, the interaction cluster indicating that the one or more computed second output context unique identification codes are likely to occur together with the input target unique identification code.

5. The computer-implemented method of claim 1, wherein determining the input set of unique identification codes includes:
   determining, using the one or more computing devices, a window size value corresponding to a length of the input set associated with the one or more virtual interaction contexts, and
   determining, using the one or more computing devices, from the list of unique identification codes, the input set of unique identification codes using the target unique identification code and the window size value, the target unique identification code being at a predetermined location relative to the one or more context unique identification codes within the input set of unique identification codes.

6. The computer-implemented method of claim 1, wherein determining the input set of unique identification codes includes clustering, using the one or more computing devices, the one or more context unique identification codes with the target unique identification code based on an electronic sales channel associated with the target unique identification code.

7. The computer-implemented method of claim 1, wherein the one or more virtual interaction contexts include one or more of a shopping cart of interaction items, a browsing session of interaction items, a wish list of interaction items, and a favorite list of interaction items.

8. The computer-implemented method of claim 1, further comprising determining, using the one or more computing devices, a number of neurons of the semantic neural network model.

9. The computer-implemented method of claim 1, wherein the semantic neural network model includes one or more of SkipGram model and Continuous Bag-of-Word model.

10. A system comprising one or more processors and a memory storing instructions that, when executed by the one or more processors, cause the system to perform operations including:
  aggregating a list of unique identification codes corresponding to items interacted with in one or more virtual interaction contexts occurring within a predetermined period of time;
  removing one or more repetitive unique identification codes from the list of unique identification codes;
  selecting a unique identification code in the list of unique identification codes as a target unique identification code;
  determining whether a number of unique identification codes in the list of unique identification codes satisfies a predetermined threshold;
  responsive to determining that the number of unique identification codes in the list of unique identification codes satisfies the predetermined threshold, determining an input set of unique identification codes from the list of unique identification codes, the input set of unique identification codes including the target unique identification code and one or more context unique identification codes;
  inputting the input set of unique identification codes into a semantic neural network model, the semantic neural network model including one or more weight matrices; and
  maximizing a probability that the target unique identification code occurs together with the one or more context unique identification codes in an interaction cluster by modifying the one or more weight matrices of the semantic neural network model based on inputting the input set of unique identification codes into the semantic neural network model.

11. The system of claim 10, wherein inputting the input set of unique identification codes into the semantic neural network model further includes:
  identifying the target unique identification code as an input unique identification code to the semantic neural network model, and
  identifying the one or more context unique identification codes as desired output context unique identification codes of the semantic neural network model corresponding to the target unique identification code.

12. The system of claim 11, wherein modifying the one or more weight matrices of the semantic neural network model includes:
  computing one or more first output context unique identification codes using the target unique identification code and the one or more weight matrices,
  computing a prediction error using the one or more computed first output context unique identification codes and the desired output context unique identification codes,
  modifying the one or more weight matrices of the semantic neural network model using the prediction error,
  determining whether the prediction error satisfies a threshold value, and
  responsive to the prediction error not satisfying the threshold value, re-inputting the input set of unique identification codes into the semantic neural network model associated with the one or more modified weight matrices.

13. The system of claim 12, wherein the operations further include:
  receiving an input target unique identification code,
  computing one or more second output context unique identification codes for the input target unique identification code using the input target unique identification code and the one or more modified weight matrices, and
  generating an interaction cluster associated with the input target unique identification code using the one or more computed second output context unique identification codes, the interaction cluster indicating that the one or more computed second output context unique identification codes are likely to occur together with the input target unique identification code.

14. The system of claim 10, wherein determining the input set of unique identification codes includes:
  determining a window size value corresponding to a length of the input set associated with the one or more virtual interaction contexts, and
  determining, from the list of unique identification codes, the input set of unique identification codes using the target unique identification code and the window size value, the target unique identification code being at a predetermined location relative to the one or more context unique identification codes within the input set of unique identification codes.

15. The system of claim 10, wherein determining the input set of unique identification codes includes clustering the one or more context unique identification codes with the target unique identification code based on an electronic sales channel associated with the target unique identification code.

16. The system of claim 10, wherein the one or more virtual interaction contexts include one or more of a shopping cart of interaction items, a browsing session of interaction items, a wish list of interaction items, and a favorite list of interaction items.

17. The system of claim 10, wherein the operations further comprise determining a number of neurons of the semantic neural network model.

18. The system of claim 10, wherein the semantic neural network model includes one or more of SkipGram model and Continuous Bag-of-Word model.

19. A computer-implemented method comprising:
  aggregating, using one or more computing devices, a list of unique identification codes corresponding to items interacted with in one or more virtual interaction contexts occurring within a predetermined period of time;
  removing, using the one or more computing devices, one or more repetitive unique identification codes from the list of unique identification codes;
  determining, using the one or more computing devices, whether a number of unique identification codes in the list of unique identification codes satisfies a predetermined threshold;
  responsive to determining that the number of unique identification codes in the list of unique identification codes satisfies the predetermined threshold, maximizing, using the one or more computing devices, a probability that a target unique identification code occurs together with one or more context unique identification codes in an interaction cluster by modifying one or more weight matrices of a semantic natural language processing model using the list of unique identification codes;

receiving, using the one or more computing devices, an input unique identification code;

computing, using the one or more computing devices, one or more output context unique identification codes for the input unique identification code using the one or more modified weight matrices of the semantic natural language processing model; and generating, using the one or more computing devices, an interaction cluster associated with the input unique identification code using the one or more computed output context unique identification codes, the interaction cluster indicating that the one or more computed output context unique identification codes are likely to occur together with the input unique identification code.

\* \* \* \* \*